United States Patent
Clark et al.

(10) Patent No.: US 9,084,511 B2
(45) Date of Patent: Jul. 21, 2015

(54) FLEXIBLE SPRAY HEAD

(75) Inventors: Charles H. Clark, Chatham, IL (US);
William E. Midden, Rochester, IL (US)

(73) Assignee: Bunn-O-Matic Corporation,
Springfield, IL (US)

( * ) Notice: Subject to any disclaimer, the term of this patent is extended or adjusted under 35 U.S.C. 154(b) by 433 days.

(21) Appl. No.: 12/909,213

(22) Filed: Oct. 21, 2010

(65) Prior Publication Data
US 2011/0094393 A1 Apr. 28, 2011

Related U.S. Application Data

(60) Provisional application No. 61/254,081, filed on Oct. 22, 2009.

(51) Int. Cl.
| A47J 31/00 | (2006.01) |
| A47J 31/46 | (2006.01) |
| A47J 31/36 | (2006.01) |
| B05B 1/14  | (2006.01) |
| B05B 1/18  | (2006.01) |

(52) U.S. Cl.
CPC .............. *A47J 31/46* (2013.01); *A47J 31/3685* (2013.01); *B05B 1/14* (2013.01); *B05B 1/18* (2013.01)

(58) Field of Classification Search
CPC ........ A47J 31/46; A47J 31/3685; B05B 1/18; B05B 1/14
USPC ................... 99/300, 304–307, 312, 314, 315; 239/558, 559, 533.14, 587.1, 602
See application file for complete search history.

(56) References Cited

U.S. PATENT DOCUMENTS

| 201,272 A | 3/1878 | Miller |
| 203,178 A | 4/1878 | Miller |
| 237,783 A | 2/1881 | Sweeney |
| 359,292 A | 3/1887 | Taylor |
| 385,880 A | 7/1888 | Racer |
| 519,657 A | 5/1894 | Barrington |
| 573,440 A | 12/1896 | Chase |
| 600,818 A | 3/1898 | West |
| 639,131 A | 12/1899 | Angus |
| 878,374 A | 2/1908 | Geissler |
| 892,846 A | 7/1908 | Jorgensen |

(Continued)

FOREIGN PATENT DOCUMENTS

WO    WO 03/092456    11/2003

*Primary Examiner* — Jianying Atkisson
(74) *Attorney, Agent, or Firm* — Barnes & Thornburg LLP

(57) ABSTRACT

Briefly, and in accordance with the foregoing, disclosed is a spray head for use with, in combination with a beverage making apparatus, as a replacement for other spray heads and a method of using a spray head. The spray head receives liquid from a liquid dispensing path of the beverage making apparatus and distributes liquid over a beverage making substance retained proximate the spray head. The spray head includes two pieces, a first piece for connection to the liquid dispensing path and the second piece which is flexible and removable attachable to the first piece. A cavity is defined between the first and second pieces. Water received form the liquid dispensing path collects in the cavity. The second piece or body portion includes a plurality of holes for dispensing and distributing water from the cavity over the beverage substance. The spray head is removable from the beverage making apparatus for facilitating direct contact and flexion cleaning of the surfaces of at least the body portion of the spray head to remove particles and mineral deposits therefrom.

22 Claims, 6 Drawing Sheets

(56) References Cited

U.S. PATENT DOCUMENTS

| | | | | |
|---|---|---|---|---|
| 1,172,390 A | | 2/1916 | Richheimer | |
| 1,351,410 A | | 8/1920 | Bruning | |
| 1,365,068 A | | 1/1921 | Tuite | |
| 1,370,782 A | | 3/1921 | Calkin | |
| 1,396,685 A | | 11/1921 | Houck | |
| 1,405,662 A | | 2/1922 | Biette | |
| 1,422,291 A | * | 7/1922 | Mulherin | 239/559 |
| 1,480,657 A | | 1/1924 | Blanke | |
| 1,489,893 A | | 4/1924 | Malcamp | |
| 1,499,281 A | | 6/1924 | Altieri | |
| 1,544,674 A | | 7/1925 | Miller | |
| 1,553,732 A | | 9/1925 | Weinberg | |
| 1,560,741 A | | 11/1925 | Topping et al. | |
| 1,680,519 A | | 8/1928 | Houck | |
| 1,763,863 A | | 6/1930 | Richheimer | |
| 1,767,956 A | | 6/1930 | Bachelder | |
| 1,769,729 A | | 7/1930 | Wentorf | |
| 1,780,751 A | | 11/1930 | Houck | |
| 1,792,218 A | | 2/1931 | Forman | |
| 2,183,049 A | | 12/1939 | Shofner, Jr. | |
| 2,308,476 A | | 1/1943 | Gerrer | |
| 2,402,741 A | | 6/1946 | Draviner | |
| 2,451,195 A | | 10/1948 | Brown | |
| 2,690,930 A | * | 10/1954 | Corson | 239/316 |
| 2,780,162 A | | 2/1957 | Chaplik | |
| 3,371,593 A | | 3/1968 | Price | |
| 3,385,201 A | | 5/1968 | Martin | |
| 3,626,839 A | | 12/1971 | Martin et al. | |
| 3,630,447 A | | 12/1971 | Smart et al. | |
| 3,696,733 A | | 10/1972 | Beverett | |
| 4,070,956 A | | 1/1978 | Brown | |
| 4,123,228 A | | 10/1978 | Frei et al. | |
| 4,138,936 A | | 2/1979 | Williams | |
| 4,309,939 A | | 1/1982 | Stover | |
| 4,354,427 A | | 10/1982 | Filipowicz et al. | |
| 4,426,920 A | | 1/1984 | Phillips et al. | |
| 4,464,981 A | | 8/1984 | Stover | |
| 4,478,139 A | | 10/1984 | Zimmerman | |
| 4,532,142 A | | 7/1985 | Dean | |
| 4,579,048 A | | 4/1986 | Stover | |
| 4,621,571 A | | 11/1986 | Roberts | |
| 4,653,389 A | | 3/1987 | Hayes | |
| 4,667,584 A | | 5/1987 | Koyama et al. | |
| 4,682,537 A | | 7/1987 | Snowball et al. | |
| 4,825,758 A | | 5/1989 | Snowball et al. | |
| 4,867,048 A | | 9/1989 | Brewer | |
| 4,892,031 A | | 1/1990 | Webster et al. | |
| 5,065,892 A | | 11/1991 | Lukez | |
| 5,172,862 A | * | 12/1992 | Heimann et al. | 239/114 |
| 5,200,221 A | | 4/1993 | Knepler | |
| 5,228,625 A | | 7/1993 | Grassberger | |
| 5,370,317 A | | 12/1994 | Weston | |
| 5,393,540 A | | 2/1995 | Bunn et al. | |
| 5,477,775 A | | 12/1995 | Delhom et al. | |
| 5,623,574 A | | 4/1997 | Knepler | |
| 5,647,055 A | | 7/1997 | Knepler | |
| 5,775,206 A | | 7/1998 | St-Gelais | |
| 5,836,236 A | | 11/1998 | Rolfes et al. | |
| 5,858,437 A | | 1/1999 | Anson | |
| 5,875,703 A | | 3/1999 | Rolfes | |
| 5,907,993 A | | 6/1999 | Van Camp et al. | |
| 5,910,205 A | | 6/1999 | Patel | |
| 5,927,179 A | | 7/1999 | Mordini et al. | |
| 5,964,368 A | | 10/1999 | Schramm | |
| 6,003,435 A | | 12/1999 | Patel | |
| 6,006,655 A | | 12/1999 | Bielfeldt et al. | |
| 6,148,717 A | | 11/2000 | Lassota | |
| 6,185,807 B1 | | 2/2001 | Kazmierczak et al. | |
| 6,244,162 B1 | | 6/2001 | Dahmen | |
| 6,260,476 B1 | | 7/2001 | Pope | |
| 6,279,458 B1 | | 8/2001 | Sham et al. | |
| 6,465,028 B2 | | 10/2002 | Gutwein et al. | |
| 6,513,419 B2 | | 2/2003 | Huber et al. | |
| 6,705,208 B2 | | 3/2004 | Lassota | |
| 6,755,119 B1 | * | 6/2004 | Lyall et al. | 99/315 |
| 6,776,357 B1 | | 8/2004 | Naito | |
| 7,093,533 B2 | | 8/2006 | Tebo, Jr. et al. | |
| 7,162,949 B1 | | 1/2007 | Hart | |
| 7,325,485 B2 | | 2/2008 | Carhuff et al. | |
| 7,584,695 B2 | | 9/2009 | Hart | |
| 7,591,218 B2 | | 9/2009 | Bunn et al. | |
| 7,654,191 B2 | | 2/2010 | Greenwald et al. | |
| 7,669,519 B2 | * | 3/2010 | Pope et al. | 99/315 |
| 7,761,962 B2 | | 7/2010 | Krauss et al. | |
| 7,798,053 B2 | | 9/2010 | Clark | |
| 7,827,904 B2 | | 11/2010 | Kobylarz | |
| 2005/0211103 A1 | | 9/2005 | Benedictus et al. | |
| 2006/0102012 A1 | | 5/2006 | Pope et al. | |
| 2006/0278092 A1 | | 12/2006 | Lyall, III | |
| 2007/0144355 A1 | | 6/2007 | Denisart et al. | |
| 2007/0186780 A1 | | 8/2007 | Clark | |
| 2007/0221069 A1 | | 9/2007 | Rahn et al. | |

\* cited by examiner

FLEXIBLE SPRAY HEAD

CROSS REFERENCE TO RELATED APPLICATIONS

This patent application claims benefit of priority under 35 U.S.C. §119(e) to U.S. provisional application No. 61/254,081, filed Oct. 22, 2009. The disclosure set forth in the referenced application is incorporated herein by reference in its entirety, including all information as originally submitted to the United States Patent and Trademark Office.

BACKGROUND

This disclosure is generally directed to a spray head which can be disassembled for cleaning. In particular, disclosed is a spray head which is designed to dispense heated water over a beverage making substance, for example ground coffee, which is located in a beverage making substance holder or funnel of a beverage maker.

Spray heads are used in beverage making equipment to dispense and distribute water to a beverage making substance. These spray heads are attached to a water delivery line generally in an upper housing portion of the beverage maker. Such spray heads are generally enclosed structures with a mounting portion for attachment to and removal from the water delivery line. A portion of the spray head includes one or more holes through which water is dispensed. A variety of attachment devices can be used to attach a spray head to a brewer including a threaded attachment, clipped attachment, magnetic attachment, as well as others which one of ordinary skill in the art would know to use without undue experimentation. These spray heads tend to be formed of two or more plastic pieces which are sealed to form a chamber for accumulating and distributing water through holed formed in the spray head.

One of the problems with currently available spray heads is that they tend to trap particles carried in the water delivered in the water delivery line. Such particles are difficult to easily and conveniently remove from the enclosed spray head. Further, depending on the condition of the water, surface of the spray heads tend to accumulate mineral deposits from dissolved minerals carried in the water. It can be time consuming to try to remove such mineral deposits from the inside surface of the enclosed spray heads by scrubbing, chipping, or chemically dissolving.

Also, currently available spray heads may not provide for broad controlled dispensing of heated water onto a wide surface area of the beverage making substance. The disclosure provides a spray head which can be removed for cleaning and which can disperse water over a wide surface area of the beverage making substance.

The disclosure provides a spray head for dispersing heated water over a wide surface area of beverage making substance.

The disclosure provides a spray head which is removable from the beverage maker to allow for easy and convenient cleaning.

Briefly, and in accordance with the foregoing, disclosed is a spray head for use with, in combination with a beverage making apparatus, as a replacement for other spray heads and a method of using a spray head. The spray head receives liquid from a liquid dispensing path of the beverage making apparatus and distributes liquid over a beverage making substance retained proximate the spray head. The spray head includes two pieces, a first piece for connection to the liquid dispensing path and the second piece which is flexible and removable attachable to the first piece. A cavity is defined between the first and second pieces. Water received form the liquid dispensing path collects in the cavity. The second piece or body portion includes a plurality of holes for dispensing and distributing water from the cavity over the beverage substance. The spray head is removable from the beverage making apparatus for facilitating direct contact and flexion cleaning of the surfaces of at least the body portion of the spray head to remove particles and mineral deposits therefrom.

Additional features will become apparent to those skilled in the art upon consideration of the following detailed description of drawings exemplifying the best mode as presently perceived.

SUMMARY OF THE DISCLOSURE

This application is directed to achieving uniform wetting of hot water contacting a bed of ground coffee to separate the coffee grounds with a mixing or turbulent flow. Improperly applying the water to the grounds can contribute to poorly brewed coffee. Conventional spray heads tend to concentrate the water flow in the center of the brew basket and do not disperse the grounds with an active attempt to create turbulence. Other objects, advantages and novel features of the present disclosure will become apparent from the following detailed description of the disclosure when considered in conjunction with the accompanying drawings.

BRIEF DESCRIPTION OF THE DRAWINGS

The detailed description particularly refers to the accompanying figures in which.

DETAILED DESCRIPTION OF THE DISCLOSURE

Figure 1:
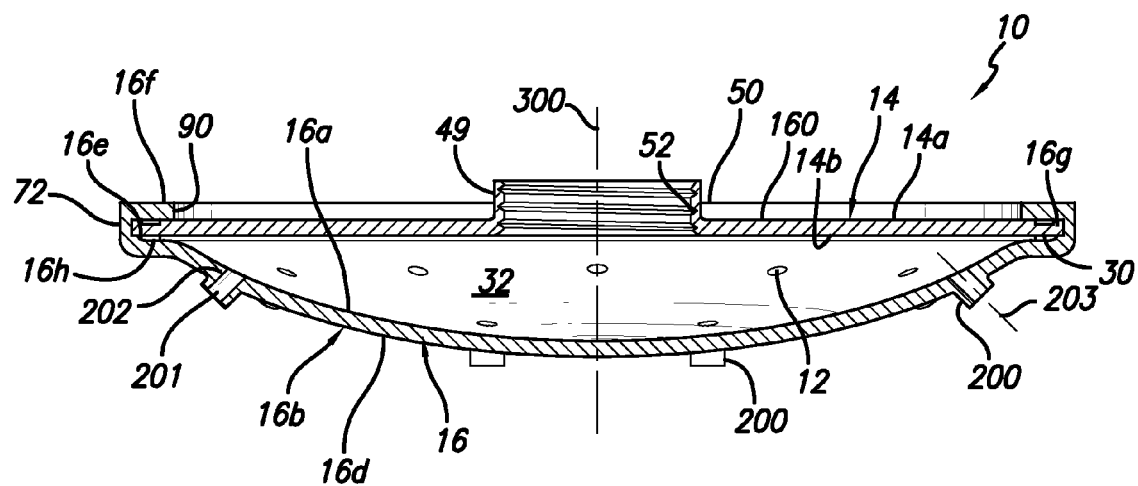
FIG. 1 is a cross-sectional view of a spray head assembly having a first portion and a second portion retained on the first portion.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

Terms including beverage and beverage making as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Figure 2:
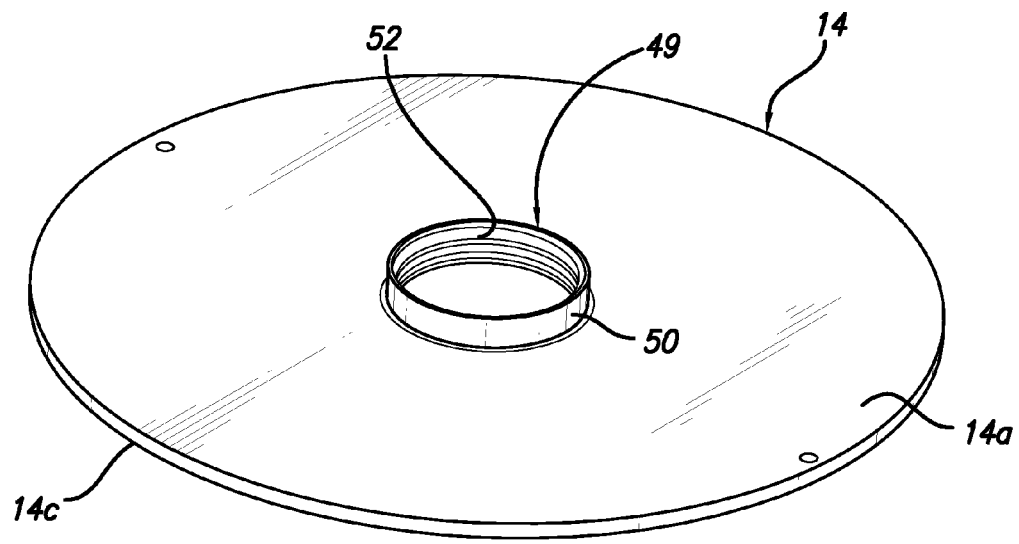
FIG. 2 is a perspective view of the first portion of the spray head assembly with the second portion removed.
Figure 3:
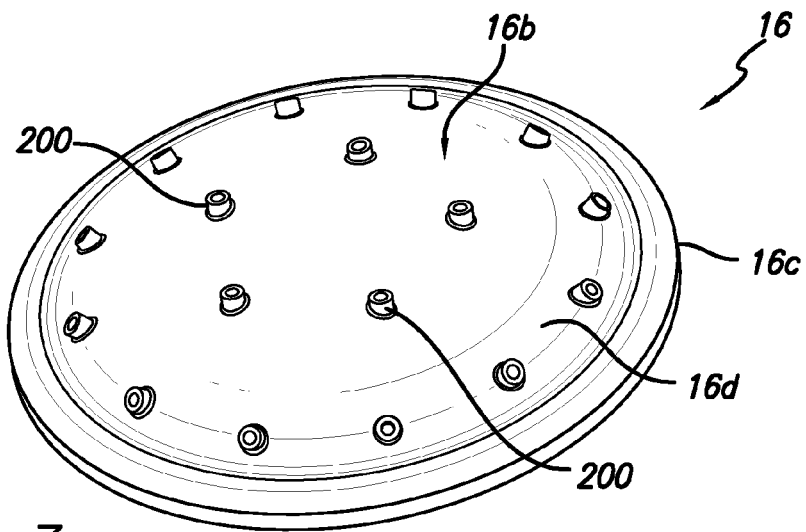
FIG. 3 is an perspective view of a face side of the second portion of the spray head assembly.

With reference to FIG. 1, a cross-sectional view of a spray head assembly 10 is shown. With further reference to FIG. 1, the spray head assembly 10 is shown having a first portion 14 and a second portion 16. When assembled the first portion 14 and second portion 16 comprise a spray head assembly 10 for use with a beverage preparation apparatus 36 (see FIG. 4) to distribute water from the beverage preparation apparatus 36 over a beverage making substance 56 (see FIG. 5). The first portion or top 14 which is used on the top of the spray head assembly 10 has a generally planar disk shaped with a connector 49 for connection to a water supply 42 of the apparatus 36. With reference to FIG. 2, the generally planar top 14 has a first side 14a, a second side 14b (see FIG. 1), and a periphery 14c for connection to the second portion 16.

The second portion or bottom 16 which is used below the top portion 14 has a generally convex disk shaped portion 16b and a periphery 16c surrounding the generally convex disk shaped portion. The generally convex disk shaped or domed portion 16b has a plurality of passages or holes 12. As shown in FIG. 1, the cross section of the generally convex disk shaped portion of bottom 16 (portion inside of the periphery 16c) is generally curved or at least partially arcuate. The generally convex disk shaped portion 16b of bottom 16 has an interior side 16a and an exterior side 16d. When assembled with the top 14, a cavity 32 is defined between the second side 14b of the top 14 and the interior side 16a of the bottom 16. In the operative position of FIG. 1 the periphery 14c of the top 14 and an internal periphery channel or cooperatively shaped annular grove 16e of the periphery 16c of the bottom 16 are engaged to retain the bottom 16 on the top 14. When attached to the water flow path 42 of the beverage maker 36, water 38 can be controllably dispensed into the cavity 32 where it may accumulate and then dispense over the beverage substance.

The exterior side 16b of bottom 16 includes passages 12 which are shown in the form of projections 200 having a generally tubular configuration. While projections 200 are shown, it should be understood that the passages 12 are to be broadly interpreted to include all forms of passages 12 and that the projections 200 are provided to show one form of passage but not the only form of passage. The projections 200 are shown by way of illustration and not limitation.

Each of the projections 200 extends outward from the exterior side 16b of communicating with passage 12. Each projection 200 defines a channel 201 for water or other liquid exiting the cavity 32. Water flowing into the cavity 32 exits through a series of interior passages 12. As seen in FIG. 1 each projection 200 has a channel 201 with a wall 202. The wall 202 forms a cylinder with the interior end 204 of the cylinder being in a plane that is not perpendicular with the axis 203 of the cylinder and with the exterior end being generally planar and substantially perpendicular to the axis 203.

The bottom 16 is made or molded from flexible material which permits selective tool less disengagement of the bottom 16 from the top 14. Bottom 16 is shaped for coupling the bottom 16 to the top 14 with the periphery 16c or outer edge facilitating grasping with the fingers of a person's hand. As shown in FIG. 1, the periphery 16c has an inwardly facing generally channel 16e. The channel 16e is engageable with the outer periphery 14c of the top 104 with the top leg of the U-shaped channel 16f overlying a portion of the top surface 14a of the top 14. The inner rim 16g of the channel 16e abuts the outer periphery 14c of the top 14 and the other bottom leg 16h of the channel 16e abuts a portion of the bottom side 14b of the top 14. The U-shaped channel 16d makes a generally water tight sealed connection between the top 14 and bottom 16. The flexible material of the bottom 16 is sufficiently flexible to permit the bottom 16 to be removed from the top 14 by hand without use of any tools or other implements. If the bottom 16 material is tighter, either by design or from changes in material or other cause, an edge or blade can be slipped under the upper leg 16f to help pry the channel 16e off of the periphery 14c.

The bottom 16 material is sufficiently flexible to permit the bottom 16 to be rolled up, twisted, or otherwise flexed to dislodge any buildup of lime or other deposits. In this regard, any accumulation of material will tend to be in the form of mineral scale or plaque. This scale is relatively brittle and will tend to crack and pulverize when the underlying material is flexed. While this is important for clearing the projections 200, and passages 12, it is also important for cleaning the interior surface 16a. Because the bottom 16 is easily removable from the top 14, the user is given an incentive to periodically remove and clean the bottom and prevent significant build up of mineral deposits. Additionally, if any other particles, such as mineral deposits which may have dislodged from the water system 42 or pipes, the removal of the bottom 16 from the top 14 will allow these particles to be removed from the cavity 32 thereby preventing blockage of the passages 12

The bottom 16 material can be selected to provide a sufficiently flexible structure to make use of a change in water pressure in the cavity 32 to change the direction of flow of the water through at least one of the plurality of holes 12. Stated differently, a change in water pressure from the water supply changes the pressure in the cavity 32 which can cause the bottom 16 to flex and change the direction of axis 203 (direction of flow through projection 200, see FIG. 1). An increase in water pressure expands the cavity 32 and slightly distends the bottom 16 which changes the curvature of the bottom 16 and changes the angles whereby the direction of flow from the projections 200 is changed.

For example, initially the bottom 16 has a shape resulting from no water in the cavity 32. When flow is begun the cavity 32 is filled and expands from an initial shape (atmospheric pressure on both interior and exterior sides 16a, 16b of the bottom 16) to an expanded shape corresponding to the maximum water pressure in the cavity 32 and then as flow is lessened the cavity 32 shape returns or restores to the initial shape. The brewer 36 may be configured to controllably supply water to the spray head assembly 10 so that the water pressure being provided is varied during a beverage making cycle (i.e., one cycle of liquid from cavity 32 is dispensed to a beverage brewing substance). As the shape of the bottom 16 changes the directional configuration of the projections 200 changes and redirects the direction of flow from the projections 200.

With reference to FIG. 1, the top 14 is positioned overlying the bottom 16. FIG. 1 shows an operative position wherein the top and bottom are engaged and define the cavity 32 therebetween. The perimeters of the top 14 and bottom 16, respectively, are generally sized and dimensioned to engagement with each other. As noted above, the perimeter 16c of bottom 16 is formed to define a channel 16e. The channel 16e is sized and dimensioned to fit over the perimeter 14c of the top 14. In this manner, the perimeter 16c including channel 16e of bottom 16 acts to hold the top 14 and bottom 16 in engagement. The internal dimension or diameter measured from opposite ends of the channel 16g is generally equal to slightly smaller than the diameter of the top 14 measured between opposite ends of the periphery 14c. The elastomeric properties of the bottom 16 may result in some degree of stretch over the top 14 to help retain the bottom 16 on the top 14

Channel 16e acts as a sealing member or gasket as well as means for retaining the top 14 and bottom 16 together. While the term sealing is used in reference to the illustrated version of the channel 16e, it may not completely seal the spray head and prevent all leakage although in the same situations such sealing may be desirable. While the spray head assembly is generally sealed to prevent leaking, depending on the application and the related manufacturing limitations, the spray head assembly 10 can be configured to further prevent leaking.

Bottom 16 is preferably a unitary single piece member. Accordingly, the bottom 16 generally and the convex disk shaped portion and the channel portion are from one material. Alternatively, the bottom 16 may be formed from more than one material to accommodate multiple objectives. The perimeter 16c may be formed of a material, while still elastomeric, is chosen for its durability for stretching, sealing or other qualities. The domed portion 16b, on the other hand may be selected for other properties such as the ability to deform under pressure and temperature or to resist change under pressure and temperature and pressure. This could even result in the material of the domed 16b portion being generally rigid. The two different materials could be co-molded or over molded one on the other. Alternatively, the two materials could be formed and then connected by heat welding, ultrasonic welding, chemical welding, adhesives or other connecting method.

Figure 4:
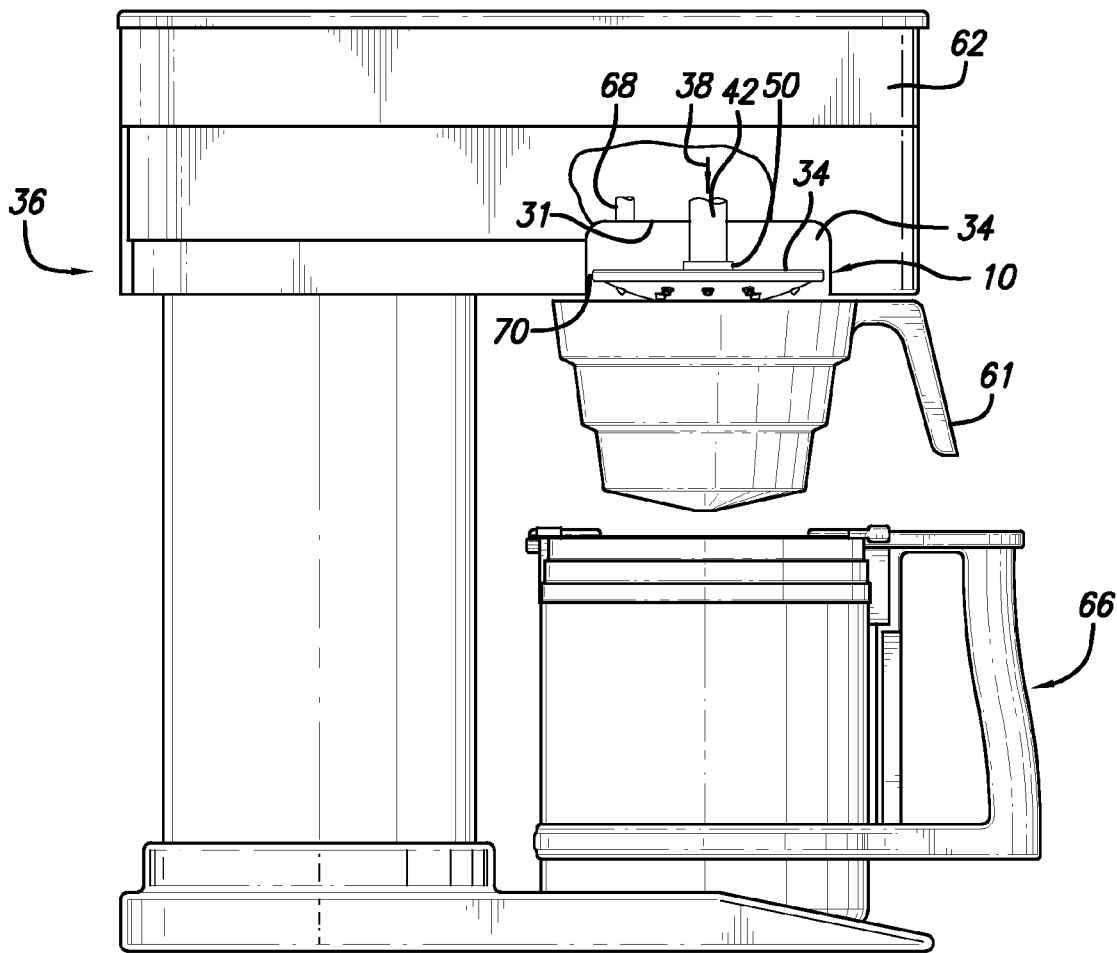
FIG. 4 is a side elevational, partial fragmentary view of a spray head assembly diagrammatically illustrated and positioned on a beverage maker or brewer for use in distributing water over beverage material retained in a substance holder.
Figure 5:
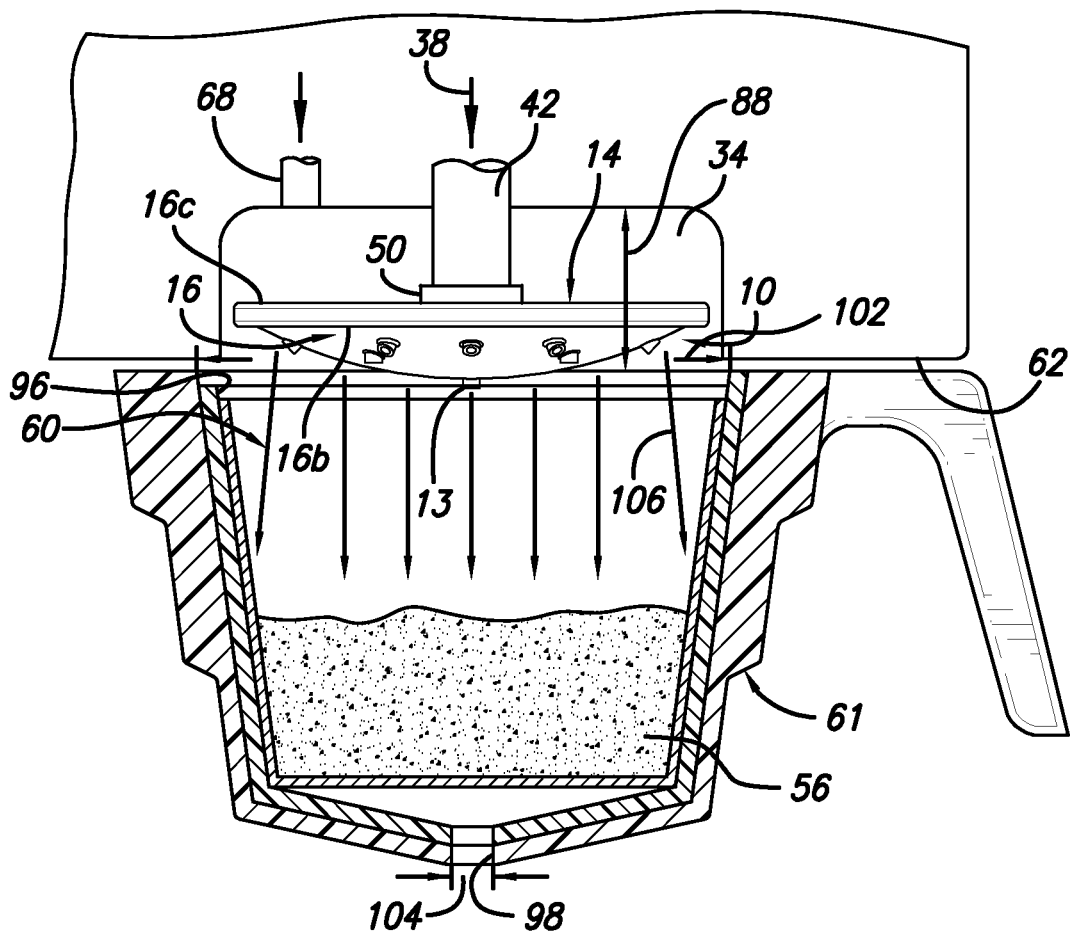
FIG. 5 is a diagrammatic partial fragmentary cross-sectional view of the substance holder the spray head positioned retained on the beverage maker proximate to the holder for dispensing water onto beverage making substance such as ground coffee retained in the holder.

When the top 16 and bottom 14 are connected, an interior surface 16b of the top 16 and interior surface 12a of the bottom 14 define the cavity 32 there between. A beverage making apparatus in the form of the brewer 36 of known construction has a water supply 42 in the form of a dispensing tube. Such a brewer 36 is of known construction such as beverage brewing devices manufactured and sold by Bunn-O-Matic Corporation of Springfield, Ill., assignee of the present application. Such brewers typically include a hot water reservoir which dispenses hot water through a water supply 42 dispensing tube connected to a spray head and distributed onto beverage making substance 56 retained in a substance holder or funnel 61. The spray head assembly 10 is attached to the hot water dispensing tube 42 and brewer 36 in the manner as shown in FIGS. 4 and 5. Hot water 38 (shown diagramatically by the arrow 38) flows into the tube 42 and into the cavity 32 communicating with the tube 42. It should be noted that a connector 49, in the form of a neck 50 is provided on the top portion 14 for attaching the spray head 10 to the brewer 36. The connector 49 includes internal threads 52 provided on the neck 50 corresponding to external threads provided on the tube 42. In this manner, the spray head 10 can be threadedly attached to the water supply tube 42. Water flowing through the water supply tube 42 flows through the connector 49 at the neck 50 and into the cavity 32.

Within the scope of the present disclosure, it is envisioned that one or more tops 16 can be provided with a spray head assembly 10 in which each of the tops has a dimension of extension 86 or cross sectional area 87 of the neck 50 which is different. In this regard, the spray head 10 can be attached to a variety of machines with the length 86 of the neck 50 accommodating a variety of machines, such as sump depth or a variety of flow rates which can be achieved by changing the top 16.

Heated water dispensed through the delivery line 42 flows into the cavity 32 and exits through the holes 12. Water flowing through the holes 12 flows outwardly onto a beverage brewing substance 56. With reference to FIG. 5, water 60 flowing through the holes is emitted in a generally outwardly and downwardly directed pattern. The directed spray pattern results from the axis 203 of the channel 201 of each hole 12 pointing the water to flow at a desired angle before descending to the beverage brewing substance 56 below. The pattern and direction of flow can be designed depending on the desired characteristics to be achieved with the spray head. Each projection 200 has a channel 201 generally shaped in the form of a cylinder. The ends of channel 201 are asymmetrical with the exit end being generally planar and the other (entrance) end being formed from the edges of hole 12 situated in an arcuate portion of the inside surface 14a of bottom 14. The angle of a plurality of channels 201 form a desired pattern to disperse the water in a generally outwardly pattern to improve saturation of the beverage brewing substance 56.

With reference to the spray head as shown and described, the spray head top 14 may be formed of any suitable generally rigid material such as metal, plastic, or rubber. The spray head bottom 16 is preferably made from an appropriate elastomeric material such as suitable latex, vinyl, rubber, silicone or any other suitable material. As noted above, the bottom 16 may also be formed of multiple materials, with at least the periphery 16c being formed of elastomeric material. More specifically, the bottom 16 could be ethylene-propylene having 70.+−0.5 durometer. Generally, it is desirable to form this material of a generally elastomeric structure so that it can be stretched over the periphery 14c to engage the channel 16e with the periphery 14c. The generally elastic or flexible nature of the bottom 16 facilitates removed from and attachment to the top 14. The elastic characteristics also provide some degree of sealing of the cavity 32 defined between the top 14 and bottom 16.

Although the embodiment shows a generally circular spray head configuration, the spray head may be shaped in other configurations including but not limited to other geometric shapes or patterns such as a triangle, square, rectangle, or oval. The generally axially symmetrical configuration of the spray head 10 shown in the figures facilitates easy attachment and removal of the top 16 and bottom 14. The shape, proportions and dimensions of the spray head as illustrated are provided by way of illustration and not limitation.

Over the course of use it will be desirable to be able to remove the bottom 16 form the top 14 or "open" the spray head 10 to facilitate cleaning of the spray head. It is not uncommon for particles or mineral deposits to flow through the dispensing line 42 into the spray head cavity 32. Many such particles or mineral deposits may flow through the holes 12 and channels 201. However, some particles may be too large to flow through these holes and channels or may become lodged in the passages and as a result may accumulate in the cavity 32, holes 12 and/or channels 201. Additionally, it is not uncommon in a brewing environment for minerals carried in the water to become deposited and/or accumulate in the spray head 10. As a result, it would be desirable to clean the inside of the spray head 10 on a regular basis.

The easy removal of the bottom 16 helps to facilitate regular cleaning of the spray head. In this regard, in order to clean the spray head the bottom 16 is removed from the periphery 14c of the top 14. All of the surfaces including the interior surfaces 14a, 14b can be cleaned by direct contact by wiping or scrubbing to remove any particles or deposits. Additionally, due to the open draining nature of the spray head assembly 10 as disclosed, these components can be placed in a dishwashing or sanitizing unit to enhance the cleaning and sanitation of the spray head. The spray head assembly 10 can be disassembled and reassembled without the use of any tools or specialized training.

Figure 6:
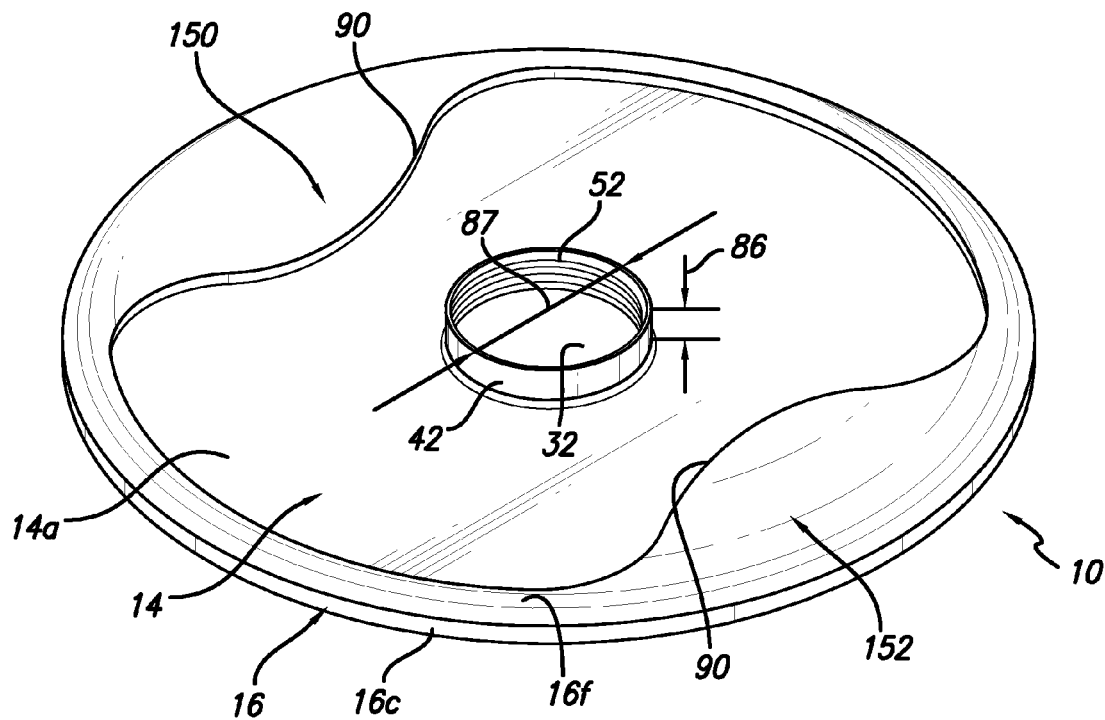
FIG. 6 is a perspective view of an embodiment of the spray head including extending portions on the second portion to facilitate gripping of the second portion for removing and attaching the second portion to the first portion.
Figure 7:
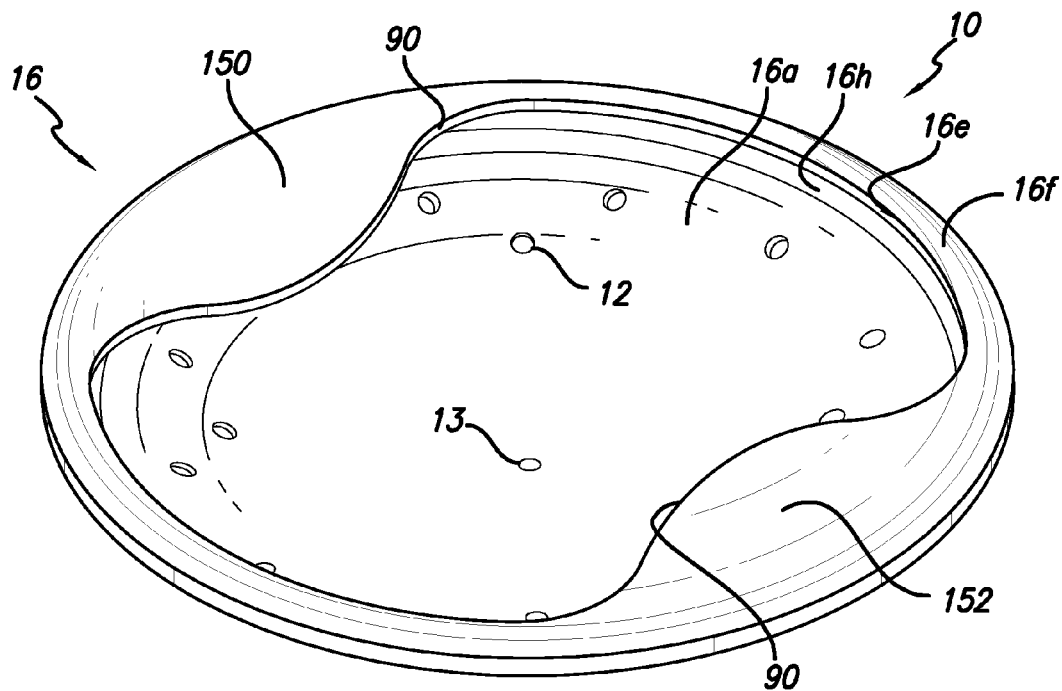
FIG. 7 is a perspective view of the second portion removed from the first portion showing and inside surface of the second portion.
Figure 8:
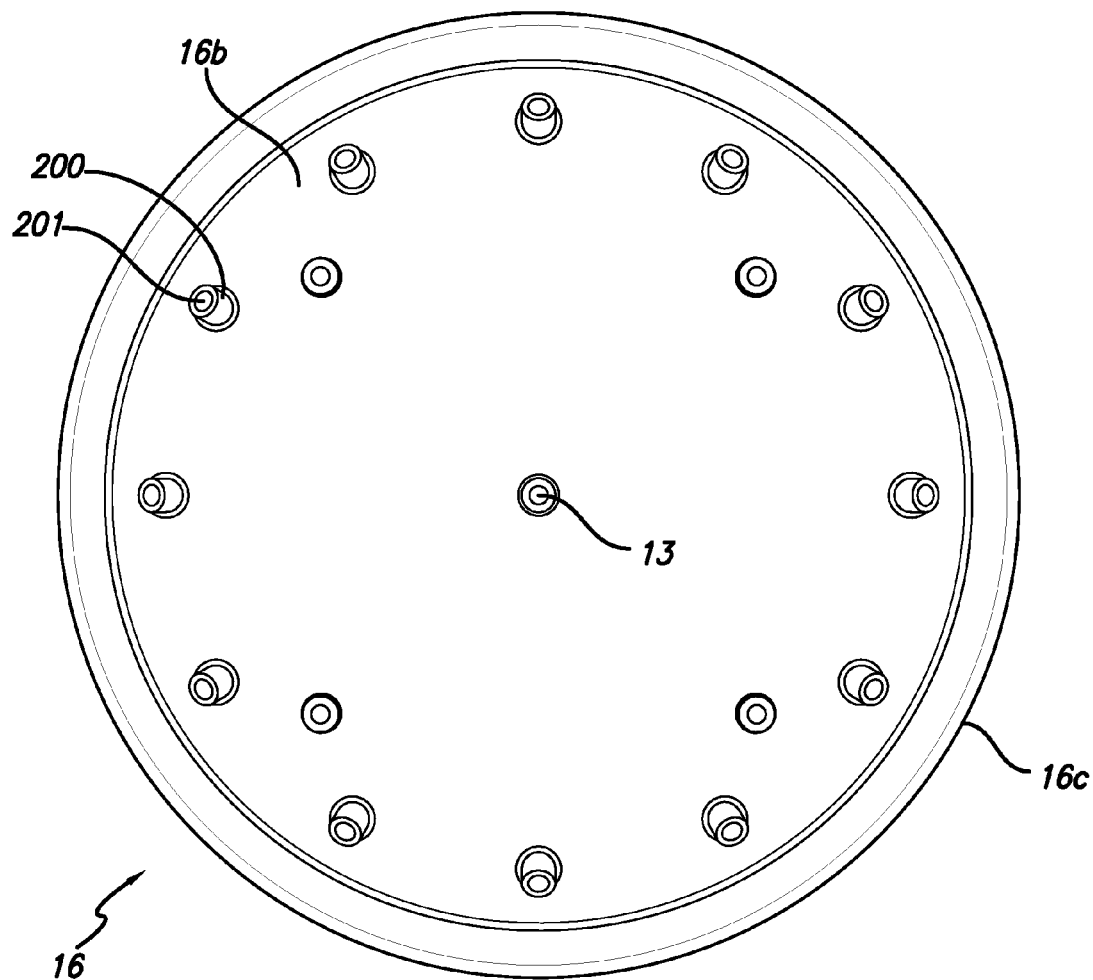
FIG. 8 is an external bottom plan view of the second portion showing dispensing passages in an at least partially arcuate exterior surface of the second portion.
Figure 9:
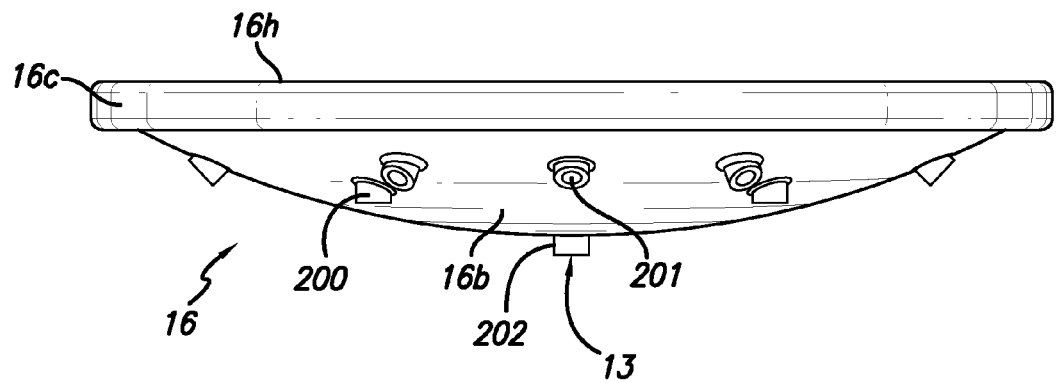
FIG. 9 is a side elevational view of the second portion.

Turning to FIGS. 6-9, an embodiment of the assembly 10 is shown which includes tabs 150, 152 that can be gripped for removal of the bottom 16 from the top 14. As shown in FIGS. 6 and 7, the tabs, 150, 152 are portions of the top leg 16f which has been enlarged to provide an enlarged gripping surface. The enlarged gripping surface allows the user to still grip the edge 90 of the bottom 16 and flex it upwardly away from the upper surface 13a of the top 14. While the tabs 150, 152 are shown as enlarged generally curved structures, the tabs can be any shape and is not limited to the shape as shown. The shape as shown is merely provided by way of illustration and not limitation. It should be understood that a single tab 150 could be provided without providing a corresponding opposing tab 152. While the symmetry may provide some mechanical advantage in removing the bottom 16 from the top 14, the use of two or more tabs is not required.

The tabs 150, 152 can also help facilitate reengaging the top 14 with the bottom 16. In use, the periphery 14c of the top 14 is engaged with the channel 16e. A portion of the periphery 16c can be worked around the edge 14c to cause significant engagement. One of the tabs 150 can be gripped to help stretch the remaining portion of the bottom 16 over the corresponding edge 14c of the top.

As also shown in FIGS. 6-9, a center hole or passage 13 is provided. The center hole 13 allows water remaining at the end of a brew cycle to drain out of the cavity 32. While the center hole 13 is also used to dispense water over the beverage making substance, it provides for a central drain at the lower most portion of the inside surface 16a of the bottom 16.

As an additional matter, the diameter of the center hole 13 may be slightly larger than the corresponding holes 12 positioned on the domed portion 16b of the bottom 16. The slightly enlarged diameter allows for reduced surface energy as a result of the larger opening 13. The enlarged center hole helps to ensure drainage of the remaining liquid after the pressure and associated energy has been reduced or ceased at the end of a brewing cycle. In other words, at the end of a brewing cycle once the pressure is relieved to the remaining volume of liquid which will necessarily drain through the center hole may have if any energy driving it through the hole. As such, related surface tension around the wall of the hole will tend to cause a bridging of water or a small bubble of water. By slighting enlarging the diameter of the hole 13 the bridging is reduced and prevents the water from hanging up inside the spray head or the corresponding channels 202 of the center hole 13. This eliminates the retention of the water in the spray head preventing mineral deposition in the center hole as well as preventing a small volume of water in the spray head, which might otherwise spill on an operator removing the spray head.

Another benefit to the spray head assembly 10 of the present disclosure is that this provides a very quick and efficient cleaning of the spray head while ensuring that the entire spray head assembly can be removed, disassembled and cleaned, reassembled and reattached, it generally prevents accidental or unintended loss of the spray head assembly 10. In this regard, one of the objectives of the spray head assembly 10 is to provide thorough yet easy and preferably tool-less disassembly and reassembly. The attached portion provides a positive indication that the spray head assembly 10 is attached or removed. Once the user returns the spray head to the machine there can be little question that the spray is attached. This is in contrast to a spray head assembly which does not securely attach through some form of attachment structure such as the threaded engagement. While the threaded engagement is not mandatory in many other forms of attachments can be devised, this form of attachment generally cannot be accidentally dislodged from the supply 42.

As shown in the figures, the spray head assembly 10 is attachable to the water supply 42 in the threaded manner as described above. It should be noted that many brewers 36 include a sump area 34 defining an interior sump surface 31. The sump area 34 allows for placement of the spray head assembly 10 out of the way of a brewing funnel 61 which is positioned beneath the spray head assembly 10. In this regard, this funnel 61 is inserted in a generally sliding motion under an overhanging portion 62 of the brewer 36. The alignment of the funnel 61 under the spray head assembly 10 positions it above a carafe 66 dispensing brewed coffee or other beverages into the carafe 66. In many brewers 36, a vent line 68 is positioned to communicate with the sump area 34. The vent 68 connects to a heated water reservoir. In the event some water or steam is vented through the vent line 68, it drains into the sump area 34 and into the underlying funnel. The spray head 10 of the present disclosure can be sized and dimensioned to fit in sump areas of virtually any size. Additionally, by attaching the spray head assembly 10 to the dispense line 42 with the spray head assembly 10 being in a sealed or closed configuration independent of the sump, the vent line 68 still can communicate with the sump. In other words, a space 70 is provided between an outside surface 72 of the bottom 14 and the sump 34 wall.

The funnel 61 has a mouth 96 through which water is received from the spray head 10 and an outlet 98 though which beverage is dispensed. The spray head assembly 10 has a radial dimension or diameter 100 which is smaller than a diameter 102 the mouth 96 and which is larger than the diameter 104 of the outlet 98. These dimensional relationships help to provide coverage of the beverage making substance with water when making beverage. The outwardly angled flow 106 of water flowing from the channels 201 helps to provide thorough coverage of the substance 56 with water 60.

In use, the spray head assembly 10 can be configured such that the second portion 16 or bottom extends downwardly towards the holder 61 such that a portion of the second portion extends into the holder below the mouth 96. As shown in FIGS. 4 and 5, since a portion of the exterior side 16d extends downwardly into the holder 61 below the mouth 96, the holder 61 will contact the second portion 16 when moving the holder 61 into engagement with the portion 62 of the brewer 36 and out of engagement. Physical contact between the holder 61 and the spray head assembly 10 causes flexion of the second portion 16. This provides a generally continuous cleaning of the spray head assembly 10 merely by use of the holder 61.

While the portion of the second portion 16 extending into the holder 61 is relatively small, as shown in the figures, this degree of extension will result in mechanical engagement between the components causing flexing of the overall structure 16b. The degree of engagement is designed so as to provide flexing or manipulation of the flexible material of the domed portion 16b yet not to exceed a force which might otherwise disengage the engaging portion or periphery 16c from the periphery 14c.

A benefit of flexing the spray head upon attaching and removing the holder 61 is that minerals or particles will fall into the holder and be disposed of when disposing of the spent brewing substance 56. Further, at the end of a brewing cycle remaining water in the spray head will tend to drip through the center passage 13. Remaining water which might have bridged over the passage of the central passage 13 is manipulated upon removing the holder 61 thereby causing the bridged water to break from the corresponding spray head surfaces and fall into the spent grounds. This helps to reduce accumulation of water in the spray head and possible accumulation of mineral deposits therein.

In other words, as the holder 61 is inserted into the brewer 36, the flexible portion 16b of the spray head assembly 10 is flicked or otherwise flexed. Any accumulation or particles that might not have been removed during the previous brewing cycle will fall into the holder 61. Additionally, this flicking or flexing of the flexible portion 16b of the spray head assembly 10 is repeated upon removing the holder from the brewer. In addition to flexing the overall surface of the flexible portion 16b, the walls of the corresponding projections 200 are also flexed thereby further preventing mineral deposit accumulation or water bridging within the channels 201.

FIG. 2 shows a brewer 36 which is generally of a smaller scale such as might be used to produce individual volumes or carafes 66 of coffee or portions thereof. It is envisioned that the spray head as disclosed may be used with a variety of beverage making apparatus regardless of how large or how small. In this regard, the spray head assembly 10 can be scaled to accommodate smaller devices as well as larger devices. While there may be some dimensional characteristics and perhaps minor changes in the materials required to accommodate the changes in size, the overall structure and function of the spray head will remain the same and consistent with that as disclosed. It is intended that this disclosure, including the attached figures, is to be broadly interpreted and apply to any number of situations in which the spray head assembly 10 may be applicable. The spray head assembly 10 may be used in devices other than the beverage making apparatus 36 as disclosed herein. For example, this type of spray head may be applicable to other industries which, in broad terms, require water or other liquids to be dispensed from a spray head 10. The spray head disclosed herein provides the benefits of easy, tool-less disassembly and reassembly and the ability to clean with direct access and contact all of the surfaces of the spray head as the result of being able to disassemble the spray head.

In use, the spray head assembly 10 as disclosed is provided as a body composed of two components including the top 14 and bottom 16. The spray head assembly 10 can be attached to the water supply 42 of a brewer 36 by threading the internal threads 52 on the neck 50 into engagement with corresponding threads provided on the corresponding end of the water supply tube 42. The peripheral portion of the bottom 16 provides for gripping the spray head while screwing it into position on the tube 42. A space 70 is provided between the exterior surface 72 of the bottom 16. The space 70 facilitates venting through the vent line 68 into the sump area 34. Heated water dispensed through the dispense line 42 into the spray head enters the spray head and flows into the cavity 32 defined between the top and bottom portions 14, 16. Water in the cavity 32 flows through the channels 201. The pattern formed by the channels 201 is generally outward and downward. As such, the spray patter facilitates spraying in the central area to thoroughly saturate the beverage brewing substance 56 retained in the funnel 61.

In order to clean the spray head 10, the spray head 10 is gripped, generally at the periphery 16c and unthreaded from the tube 42 to remove it from the brewer. Alternatively, the bottom 16 can be removed from the top 14, leaving the top 14 in place. However, it may be preferred depending on the situation to remove the entire assembly 10 for cleaning. Once removed, the bottom 16 is disengaged from the periphery 14c to disassemble the top 14 from the bottom 16. For example, one edge 90 defining the channel 16e of the bottom 16 can be flexibly displaced or peel from the top periphery 14c. This is done by use of finger gripping the edge 90 and peeling or displacing it from the top periphery 14c. Once an initial start has occurred, the remainder of the channel 30 tends to strip or otherwise be removed quite easily. When disassembled, the interior surfaces 14b, 16a as well as exterior surfaces 14a, 16b of the top 14 and bottom 16 can be manually cleaned or placed in an appropriate dishwashing or sanitation device. In the event that particles or mineral deposits lodge in the holes 12, channels 201, the generally open structure of the top and bottom portions 16, 14 allow the person cleaning the spray head 10 to use an appropriate instrument to dislodge such particles or deposits. The flexible material allows the blocking material to be removed by crushing or by flexing to pass the material.

The spray head assembly 10 as disclosed will not require any tools for attachment or removal relative to the brewer 36 and does not require any tools for disassembly or reassembly. Reassembly generally starts by engaging a portion of the channel 16e onto the periphery 14c of the top 14. Once a portion of the channel 16e has been fitted over the periphery 14c the remainder of the channel 16e can be similarly positioned. At some point a substantial portion of the channel 16e has been positioned over the periphery 14c and the remaining portion of the channel 16e must be stretched slightly to fit over the remaining periphery 14c. All of the surfaces and structures can be manually cleaned or automatically cleaned. While a variety of materials can be used, it is envisioned that it is preferable in the disclosed application that a food grade quality approved or certified material will be used as appropriate.

Figure 10:
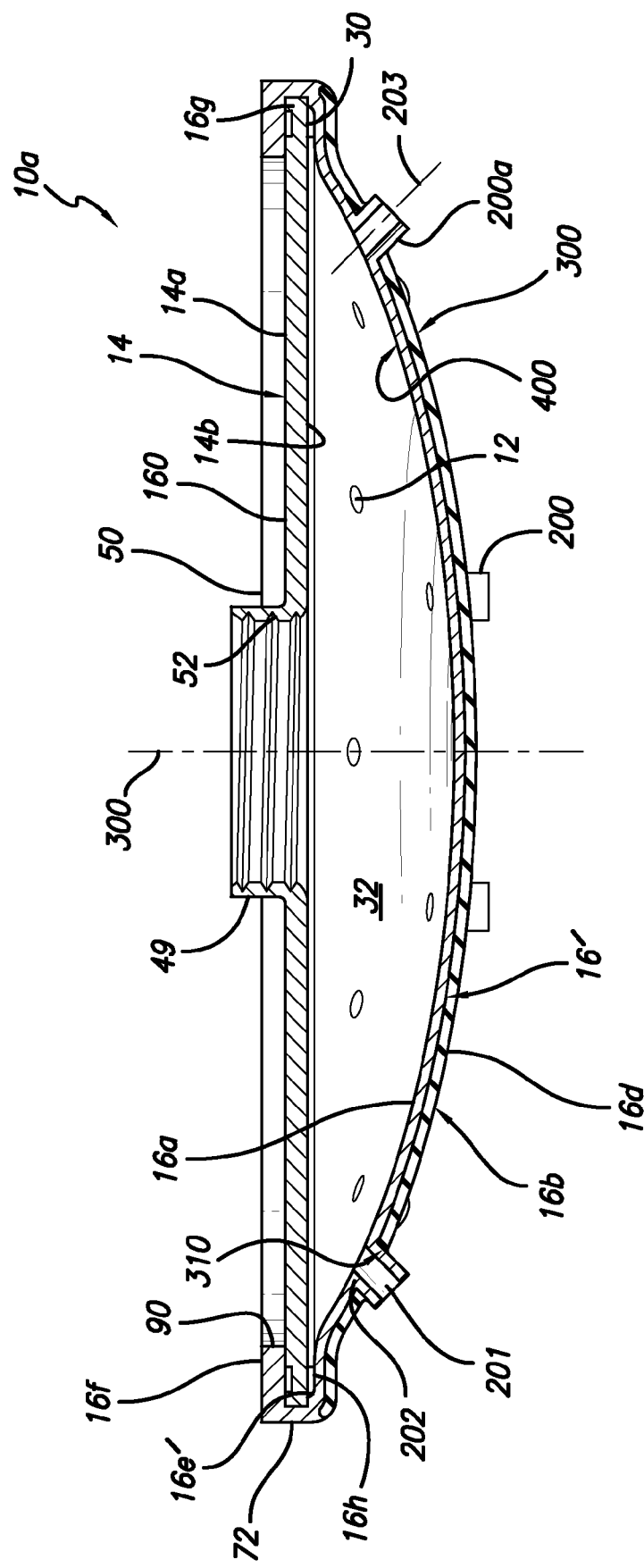
FIG. 10 is a cross-sectional view of another embodiment of the spray head assembly having a first portion and a second portion retained on the first portion, with the second portion having a rigid portion and a flexible portion carried on the rigid portion.

With reference to FIG. 10, an enlarged cross sectional view of an alternate embodiment of a spray head 10a is shown. In this embodiment, the spray head 10a includes a second portion 16' which is comprised two components, a rigid component 300 and a flexible over molded portion 400. The features of the flexible portion 400 are similar to that as shown and described in the embodiment previously discussed. In this regard, the flexible over molded portion 400 includes flexible tubes 200a extending there through. The structure function of these tubes 200a is described hereinabove with regard to the other embodiments. The rigid portion 300 includes a series of holes 310 through which the flexible portion 400 extends and through which the tubes 200a are formed. In this regard, the spray head 10a provides the benefits as described hereinabove with regard to maintenance and removal of mineral deposits. Additionally, the rigid layer 400 helps to protect the spray head 10a from punctures and wear. Additionally, the rigid portion 300 can help maintain dimensional consistency during dispensing when it might not be desired to provide some degree of flexion or alteration of the slop paths.

The alternate embodiment in FIG. 10 can include a channel 16e' which is formed on the over molded flexible material. Additionally, the channel 16e' can be formed of the rigid material. Regardless of the characteristics of the material used to form the channel 16e', the channel 16e' is still provided to provide a snap fit connection of the second portion 16' with the first portion 14.

In use, the spray head 10a shown in FIG. 10 operates in the same manner as the spray head 10 as shown in FIGS. 1-9. In this regard, the spray head 10a is attachable to a brewer for dispensing brew water over a brewing substance. For purposes of cleaning, the second portion 16' can be removed from the first portion 14 to provide thorough cleaning of the spray head. The spray head 10a can include a channel which is neither rigid nor flexible. The rigid portion 300 extends and forms the domed portion of the spray head with holes 310 formed therein. A flexible material 400 is over molded on the rigid portion 300 to provide extending tubes 200a of a flexible material.

The disclosure of U.S. patent application Ser. No. 10/513,752 filed May 6, 2003 and all related applications from which this application claims priority, is expressly incorporated herein by reference in its entirety.

While a preferred embodiment of the disclosure is shown and described, it is envisioned that those skilled in the art may devise various modifications and equivalents without departing from the spirit and scope of the disclosure as recited in the following claims. Although the present disclosure has been described and illustrated in detail, it is to be clearly understood that the same is by way of illustration and example only, and is not to be taken by way of limitation. The spirit and scope of the present disclosure are to be limited only by the terms of the appended claims.

What is claimed:

1. A spray head assembly for use with a beverage making apparatus to distribute water from the beverage making apparatus over a beverage making substance, the spray head assembly comprising:
   a first portion having an interior, an exterior, and a periphery, the first portion receiving water from the beverage making apparatus, the first portion being formed of a generally rigid material;
   a connector generally on the exterior of the first portion configured for connecting the first portion to the beverage making apparatus;
   a second portion having an interior, an exterior, and an engaging portion configured for selectively removably attaching to at least a portion of the periphery of the first portion, the engaging portion of the second portion being at least partially formed of a flexible elastomeric material, the engaging portion comprising at least one tab configured to allow a user to grip the flexible elastomeric material, pull it and remove the second portion from the first portion, the at least one tab being an enlarged portion of the engaging portion, and the at least one tab overlapping the first portion;
   the spray head assembly having an operative configuration with the second portion engaged on the first portion defining a cavity generally between the interior of the first portion and the interior of the second portion; and
   a plurality of passages in the flexible elastomeric material extending from the interior to the exterior of the second portion, water dispensed into the cavity passing out of the cavity through the passages.

2. The spray head assembly of claim 1, further comprising the second portion being formed as a unitary single piece body of at least one elastomeric material.

3. The spray head assembly of claim 1, wherein the engaging portion of the second portion includes an at least partially annular groove for engagement with at least a portion of the periphery of the first portion.

4. The spray head assembly of claim 2, wherein the annular groove defines an inwardly facing generally U-shaped channel carried on the second portion.

5. The spray head assembly of claim 4, wherein the generally annular groove receives and engages the outer periphery of the first portion with a first leg of the U-shaped channel overlying a portion of the exterior of the first portion and a second leg of the U-shaped channel underlying a portion of interior of the first portion for retaining the first portion therebetween.

6. The spray head assembly of claim 1, further comprising at least one projection on the exterior of the second portion communicating with and extending from at least one of the passages, the projection having wall defining an interior channel.

7. The spray head assembly of claim 1, wherein the flexible material is sufficiently flexible to permit the second portion to be removed from the first portion by hand without use of any implement.

8. The spray head assembly of claim 1, wherein the flexible material is sufficiently flexible to permit the second portion to be removed from the first portion by flexing and stretching at least a portion of the second portion to peel the second portion off of the first portion.

9. The spray head assembly of claim 1, wherein the flexible material of the second portion is sufficiently flexible to permit the second portion to be flexed to dislodge mineral or particle accumulation.

10. The spray head assembly of claim 1, wherein the portion of the second portion generally surrounded by the engaging portion has an at least partially arcuate shape.

11. The spray head assembly of claim 6, further comprising the projection interior channel defining an axis along the direction of flow.

12. The spray head assembly of claim 11, whereby a change in water pressure in the cavity will cause a dimensional change in the flexible second portion and change the direction of flow of the water through the projection along the axis.

13. A spray head assembly for use with a beverage making apparatus to distribute water from the beverage making apparatus over a beverage making substance, the spray head assembly comprising:
   a generally rigid, circular planar first portion defining a periphery;
   a connector on the first portion for selective attachment to a water supply of a beverage making apparatus;
   a second portion formed of a flexible elastomeric material;
   an engaging portion formed as a unitary continuation of the second portion for flexibly engaging the periphery of the first portion in an assembled operative configuration;
   the first and second portions define a cavity therebetween when in the assembled operative configuration, the cavity having an interior and an exterior; and
   a plurality of flexible passages extending through the second portion and communicating with the cavity, at least one of the passages forming a cylinder having an axis with the interior end of the cylinder being in a plane that is not perpendicular with the axis and with the exterior end of the cylinder projecting outwardly from the second portion and being in a plane substantially perpendicular to the axis.

14. The spray head assembly of claim 13, further comprising the second portion being formed as a unitary single piece body of at least one elastomeric material.

15. The spray head assembly of claim 13, wherein the engaging portion on the second portion includes a flexible annular groove for engagement the periphery of the first portion.

16. The spray head assembly of claim 15, wherein the annular groove defines an inwardly facing generally U-shaped channel carried on the second portion for receiving and engaging the periphery of the first portion, a first leg of the U-shaped channel overlying a portion of the exterior of the first portion and a second leg of the U-shaped channel underlying a portion of interior of the first portion for retaining the first portion therebetween.

17. The spray head assembly of claim 13, wherein the flexible material is sufficiently flexible to permit the second portion to be removed from the first portion by flexing and stretching at least a portion of the engaging portion of the second portion to peel the second portion off of the first portion.

18. The spray head assembly of claim 13, wherein the flexible material of the second portion is sufficiently flexible to permit the second portion to be flexed to dislodge mineral or particle accumulation.

19. The spray head assembly of claim 13, wherein the portion of the second portion generally surrounded by the engaging portion has a generally arcuate shape.

20. The spray head assembly of claim 13, further comprising a plurality of projections on the exterior of the second portion communicating with and extending from corresponding passages, each projection having a wall defining an interior channel.

21. The spray head assembly of claim 20, further comprising the projection interior channel defining an axis along the direction of flow.

22. The spray head assembly of claim 21, whereby a change in water pressure in the cavity will cause a dimensional change in the flexible second portion and change the direction of flow of the water through the projection along the axis.

* * * * *